United States Patent
Turtinen et al.

(10) Patent No.: US 11,304,239 B2
(45) Date of Patent: Apr. 12, 2022

(54) RANDOM ACCESS PROCEDURE

(71) Applicant: Nokia Technologies Oy, Espoo (FI)

(72) Inventors: Samuli Turtinen, Ii (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 33 days.

(21) Appl. No.: 16/915,224

(22) Filed: Jun. 29, 2020

(65) Prior Publication Data

US 2021/0100035 A1 Apr. 1, 2021

(30) Foreign Application Priority Data

Sep. 27, 2019 (WO) ................ PCT/CN2019/108437

(51) Int. Cl.
*H04W 74/08* (2009.01)
*H04L 41/0668* (2022.01)
*H04L 43/16* (2022.01)

(52) U.S. Cl.
CPC ..... *H04W 74/0833* (2013.01); *H04L 41/0668* (2013.01); *H04L 43/16* (2013.01)

(58) Field of Classification Search
CPC . H04W 74/0833; H04L 43/16; H04L 41/0668
USPC ....................................................... 370/216
See application file for complete search history.

(56) References Cited

U.S. PATENT DOCUMENTS

| 2018/0110075 | A1 | 4/2018 | Ly et al. | |
| 2019/0132882 | A1 | 5/2019 | Li et al. | |
| 2020/0344812 | A1* | 10/2020 | Agiwal | ............ H04W 74/0833 |
| 2020/0404711 | A1* | 12/2020 | Zhao | .................... H04W 52/36 |

FOREIGN PATENT DOCUMENTS

| CN | 108271275 A | 7/2018 |
| CN | 110169186 A | 8/2019 |

OTHER PUBLICATIONS

"Revised work item proposal: 2-step RACH for NR", 3GPP TSG RAN Meeting #83, RP-190711, Agenda: 9.4.7, ZTE Corporation, Mar. 18-21, 2019, 4 pages.

"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

(Continued)

*Primary Examiner* — Rownak Islam
(74) *Attorney, Agent, or Firm* — Squire Patton Boggs (US) LLP

(57) ABSTRACT

There is disclosed an apparatus. The apparatus comprises means for using a first random access type in a random access procedure; and in response to determining that a threshold number of failed random access attempts has been reached using the first random access type, determining whether to switch to using a second random access type which is different from the first random access type.

17 Claims, 9 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 15)", 3GPP TS 38.300, V15.7.0, Sep. 2019, pp. 1-99.

"Running CR for 2-step RACH", 3GPP TSG-RAN WG2 Meeting #107, R2-1909158, ZTE Corporation, Aug. 26-30, 2019, 6 pages.

International Search Report and Written Opinion received for corresponding Patent Cooperation Treaty Application No. PCT/CN2019/108437, dated Jun. 22, 2020, 8 pages.

"Fallback Procedure from 2-step RACH to 4-step RACH", 3GPP TSG RAN WG2 Meeting #106, R2-1905651, vivo, Agenda: 11.13.3, May 13-17, 2019, 4 pages.

"2-step RACH to 4-step RACH fallback", 3GPP TSG RAN WG2 NR Adhoc, R2-1700137, Sony, Agenda: 3.2.1.4, Jan. 17-19, 2017, 3 pages.

"Fall back procedure from 2-step RACH to 4-step RACH msg1", 3GPP TSG RAN WG2 Meeting #107, R2-1909905, Sony, Agenda: 11.13.3, Aug. 26-30, 2019, 3 pages.

Extended European Search Report received for corresponding European Patent Application No. 20191661.6, dated Jan. 13, 2021, 8 pages.

First Office Action dated Nov. 29, 2021 corresponding to Chinese Patent Application No. 202010913758.X, with English Summary thereof.

\* cited by examiner

RANDOM ACCESS PROCEDURE

RELATED APPLICATION

This application claims priority from PCT Application No.: PCT/CN2019/108437 filed on Sep. 27, 2019, which is hereby incorporated in its entirety.

FIELD

This disclosure relates to communications, and more particularly to random access procedures in a wireless communication system.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A). Since introduction of fourth generation (4G) services increasing interest has been paid to the next, or fifth generation (5G) standard. 5G may also be referred to as a New Radio (NR) network. Standardization of 5G or New Radio networks has been finalized in 3GPP release 15.

A random-access channel (RACH) is a shared channel used by wireless terminals (e.g. user equipment) to access the mobile network, for example for call set-up and/or for bursty data transmissions. A UE needs to schedule the RACH whenever the UE wants to schedule a UE-originating communication.

SUMMARY

According to a first aspect there is disclosed an apparatus comprising means for performing: using a first random access type in a random access procedure; in response to determining that a threshold number of failed random access attempts has been reached using the first random access type, determining whether to switch to using a second random access type which is different from the first random access type.

According to some examples the determining whether to switch comprises determining whether to switch to using a second random access type which is different from the first random access type or whether to continue using the first random access type.

According to some examples the means are further configured to perform switching to the second random access type in a manner that is in accordance with a configuration provided by a network.

According to some examples the configuration provided by the network explicitly configures whether the apparatus is allowed to switch to the second random access type.

According to some examples the configuration provided by the network configures the user equipment to use a preamble group in the second random access type in dependence on a preamble group used in the first random access type.

According to some examples the configuration provided by the network configures the user equipment to use a second preamble group in the second random access type when a first preamble group was used in the first random access type.

According to some examples, the determining whether to switch to the second random access type is based at least in part on a comparison between a data payload size associated with a preamble used in the first random access type and a data payload size associated with a preamble available in the second random access type.

According to some examples, the using a first random access type comprises using a first preamble or a second preamble which are available in the first random type, and the determining whether to switch to the second random access type is dependent on whether the second random access type has an available preamble which has an associated data payload size which matches a data payload size associated with the first or second preamble which was used in the first random access type.

According to some examples the using a first random access type comprises using a first preamble or a second preamble which are available in the first random type, and the determining whether to switch to the second random access type is dependent on whether the second random access type has an available preamble which has an associated data payload size which is equal to or greater than a data payload size associated with the first or second preamble which was used in the first random access type.

According to some examples, the first preamble of the first random access type comprises a group A preamble and the second preamble of the first random access type comprises a group B preamble.

According to some examples the available preambles of the second random access type comprise a third preamble and a fourth preamble, the third preamble comprising a group A preamble and the fourth preamble comprising a group B preamble.

According to some examples the means are further configured to perform receiving a network configuration which configures the apparatus to use the group A preamble or the group B preamble of the second random access type when the threshold number of failed attempts has been reached and the apparatus is switching to the second random access type.

According to some examples the means are further configured to perform determining whether to switch to the second random access type based at least in part on a determination of a data payload to be transmitted by the apparatus.

According to some examples the first random access type comprises a two-step random access and the second random access type comprises a four-step random access.

According to some examples the apparatus comprises a user equipment.

According to some examples the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: using a first random access type in a random access procedure; in response to determining that a threshold number of failed random access attempts has been reached using the first random access type, determining whether to switch to using a second random access type which is different from the first random access type.

According to a third aspect there is provided an apparatus comprising: using circuitry for using a first random access type in a random access procedure; and determining circuitry for, in response to determining that a threshold number of failed random access attempts has been reached using the first random access type, determining whether to switch to using a second random access type which is different from the first random access type.

According to a fourth aspect there is provided a method comprising: using a first random access type in a random access procedure; and in response to determining that a threshold number of failed random access attempts has been reached using the first random access type, determining whether to switch to using a second random access type which is different from the first random access type.

According to some examples, the determining whether to switch comprises determining whether to switch to using a second random access type which is different from the first random access type or whether to continue using the first random access type.

According to some examples, the method comprises switching to the second random access type in a manner that is in accordance with a configuration provided by a network.

According to some examples the configuration provided by the network explicitly configures whether switching to the second random access type is allowed.

According to some examples the configuration provided by the network configures use of a preamble group in the second random access type in dependence on a preamble group used in the first random access type.

According to some examples the configuration provided by the network configures use of a second preamble group in the second random access type when a first preamble group was used in the first random access type.

According to some examples the determining whether to switch to the second random access type is based at least in part on a comparison between a data payload size associated with a preamble used in the first random access type and a data payload size associated with a preamble available in the second random access type.

According to some examples the using a first random access type comprises using a first preamble or a second preamble which are available in the first random type, and the determining whether to switch to the second random access type is dependent on whether the second random access type has an available preamble which has an associated data payload size which matches a data payload size associated with the first or second preamble which was used in the first random access type.

According to some examples the using a first random access type comprises using a first preamble or a second preamble which are available in the first random type, and the determining whether to switch to the second random access type is dependent on whether the second random access type has an available preamble which has an associated data payload size which is equal to or greater than a data payload size associated with the first or second preamble which was used in the first random access type.

According to some examples the first preamble of the first random access type comprises a group A preamble and the second preamble of the first random access type comprises a group B preamble.

According to some examples the available preambles of the second random access type comprises a third preamble and a fourth preamble, the third preamble comprising a group A preamble and the fourth preamble comprising a group B preamble.

According to some examples the means are further configured to perform receiving a network configuration which configures the apparatus to use the group A preamble or the group B preamble of the second random access type when the threshold number of failed attempts has been reached and the apparatus is switching to the second random access type.

According to some examples the method comprises determining whether to switch to the second random access type based at least in part on a determination of a data payload to be transmitted.

According to some examples the first random access type comprises a two-step random access and the second random access type comprises a four-step random access.

According to some examples the method is performed by a user equipment.

According to a fifth aspect there is provided a computer program comprising instructions for causing an apparatus to perform at least the following: using a first random access type in a random access procedure; and in response to determining that a threshold number of failed random access attempts has been reached using the first random access type, determining whether to switch to using a second random access type which is different from the first random access type.

According to a sixth aspect there is provided a computer program comprising instructions stored thereon for performing at least the following: using a first random access type in a random access procedure; and in response to determining that a threshold number of failed random access attempts has been reached using the first random access type, determining whether to switch to using a second random access type which is different from the first random access type.

According to a seventh aspect there is provided a non-transitory computer readable medium comprising program instructions for causing an apparatus to perform at least the following: using a first random access type in a random access procedure; and in response to determining that a threshold number of failed random access attempts has been reached using the first random access type, determining whether to switch to using a second random access type which is different from the first random access type.

According to an eighth aspect there is provided a non-transitory computer readable medium comprising program instructions stored thereon for performing at least the following: using a first random access type in a random access procedure; and in response to determining that a threshold number of failed random access attempts has been reached using the first random access type, determining whether to switch to using a second random access type which is different from the first random access type.

According to a ninth aspect there is provided an apparatus comprising means for performing: configuring a user equipment with a threshold number of failed attempts to access a random access channel using a first random access type before switching to a second random access type; and configuring whether the threshold number of failed attempts applies to at least one of a first preamble group and a second preamble group of the first random access type.

According to some examples the first preamble group of the first random access type comprises a group A preamble and the second preamble group of the first random access type comprises a group B preamble.

According to some examples the means are further configured to perform configuring the user equipment to switch to the second random access type after the threshold number of failed attempts has been reached only when the user equipment was using the group A preamble in the first random access type.

According to some examples, the means are further configured to perform configuring the user equipment to use one of a third preamble group and a fourth preamble group of the second random access type when switching to the second random access procedure.

According to some examples, the third preamble group of the second random access type comprises a group A preamble and the fourth preamble group of the second random access type comprises a group B preamble.

According to some examples, the means are further configured to perform configuring the user equipment with data thresholds for determining whether to use the preamble group A or the preamble group B of the first random access type, and configuring the user equipment with data thresholds for determining whether to use the preamble group A or the preamble group B of the second random access type.

According to some examples, the means are further configured to perform: configuring the user equipment with a Boolean configuration for the preamble group B of the first random access type, to indicate whether the user equipment is allowed to switch to the second random access procedure.

According to some examples, the apparatus comprises a base station.

According to some examples, the means comprises at least one processor; and at least one memory including computer program code, the at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: configuring a user equipment with a threshold number of failed attempts to access a random access channel using a first random access type before switching to a second random access type; and configuring whether the threshold number of failed attempts applies to at least one of a first preamble group and a second preamble group of the first random access type.

According to an eleventh aspect there is provided an apparatus comprising: configuring circuitry for configuring a user equipment with a threshold number of failed attempts to access a random access channel using a first random access type before switching to a second random access type; and configuring whether the threshold number of failed attempts applies to at least one of a first preamble group and a second preamble group of the first random access type.

According to a twelfth aspect there is provided a method comprising: configuring a user equipment with a threshold number of failed attempts to access a random access channel using a first random access type before switching to a second random access type; and configuring whether the threshold number of failed attempts applies to at least one of a first preamble group and a second preamble group of the first random access type.

According to some examples, the first preamble group of the first random access type comprises a group A preamble and the second preamble group of the first random access type comprises a group B preamble.

According to some examples the means are further configured to perform configuring the user equipment to switch to the second random access type after the threshold number of failed attempts has been reached only when the user equipment was using the group A preamble in the first random access type.

According to some examples the method further comprises configuring the user equipment to use one of a third preamble group and a fourth preamble group of the second random access type when switching to the second random access procedure.

According to some examples the third preamble group of the second random access type comprises a group A preamble and the fourth preamble group of the second random access type comprises a group B preamble.

According to some examples the method comprises configuring the user equipment with data thresholds for determining whether to use the preamble group A or the preamble group B of the first random access type, and configuring the user equipment with data thresholds for determining whether to use the preamble group A or the preamble group B of the second random access type.

According to some examples the means are further configured to perform: configuring the user equipment with a Boolean configuration for the preamble group B of the first random access type, to indicate whether the user equipment is allowed to switch to the second random access procedure.

According to some examples the method is performed by a base station.

According to a thirteenth aspect there is provided a computer program comprising instructions for causing an apparatus to perform at least the following: configuring a user equipment with a threshold number of failed attempts to access a random access channel using a first random access type before switching to a second random access type; and configuring whether the threshold number of failed attempts applies to at least one of a first preamble group and a second preamble group of the first random access type.

According to a fourteenth aspect there is provided a computer program comprising instructions stored thereon for performing at least the following: configuring a user equipment with a threshold number of failed attempts to access a random access channel using a first random access type before switching to a second random access type; and configuring whether the threshold number of failed attempts applies to at least one of a first preamble group and a second preamble group of the first random access type.

According to a fifteenth aspect there is provided a non-transitory computer readable medium comprising program instructions for causing an apparatus to perform at least the following: configuring a user equipment with a threshold number of failed attempts to access a random access channel using a first random access type before switching to a second random access type; and configuring whether the threshold number of failed attempts applies to at least one of a first preamble group and a second preamble group of the first random access type.

According to a sixteenth aspect there is provided a non-transitory computer readable medium comprising program instructions stored thereon for performing at least the following: configuring a user equipment with a threshold number of failed attempts to access a random access channel using a first random access type before switching to a second random access type; and configuring whether the threshold number of failed attempts applies to at least one of a first preamble group and a second preamble group of the first random access type.

DETAILED DESCRIPTION

As mentioned above, a random-access channel (RACH) is a shared channel used by wireless terminals (e.g. user equipment (UE)) to access a mobile network, for example for call set-up and/or for bursty data transmissions. A UE needs to schedule the RACH whenever the UE wants to schedule a UE-originating communication. There are different random access (RA) procedure types (which may also be referred to simply as RA types) for accessing the RACH. For example both 2-step and 4-step procedures are known. 2-step RACH work is currently ongoing in RAN (Radio Access Network) WGs (working groups). See for example 3GPP TSG RAN Meeting #83 RP-190711.

The 2-step procedure is initiated with a message, known as MSGA (message A), sent from a UE to a base station (e.g. gNB). MSGA comprises a preamble (known as Msg1) and a payload over PUSCH transmissions of the 2-step random access procedure.

The gNB responds to the UE with a message, known as MSGB. MSGB contains zero or one back-off indication; zero or more fall-back indications to schedule MSG3 transmission; zero or more contention resolution messages; and Signalling Radio Bearer (SRB) data for zero or one UE along with the contention resolution message.

As described in 3GPP TS 38.300 a random access (RA) procedure may be triggered by a number of events, including:

Initial access from RRC_IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR (scheduling request) available;
SR failure;
Request by RRC upon synchronous reconfiguration (e.g. handover);
Transition from RRC_INACTIVE;
To establish time alignment for a secondary TAG (timing advance group);
Request for Other SI (system information)
Beam failure recovery As disclosed in 3GPP R2-1909158, three types of random access procedure are supported: A four-step contention-based random access (CBRA) (see FIG. 1A); a two-step CBRA (see FIG. 1B); and contention-free random access (CFRA) (see FIG. 1C).

Figure 1A:
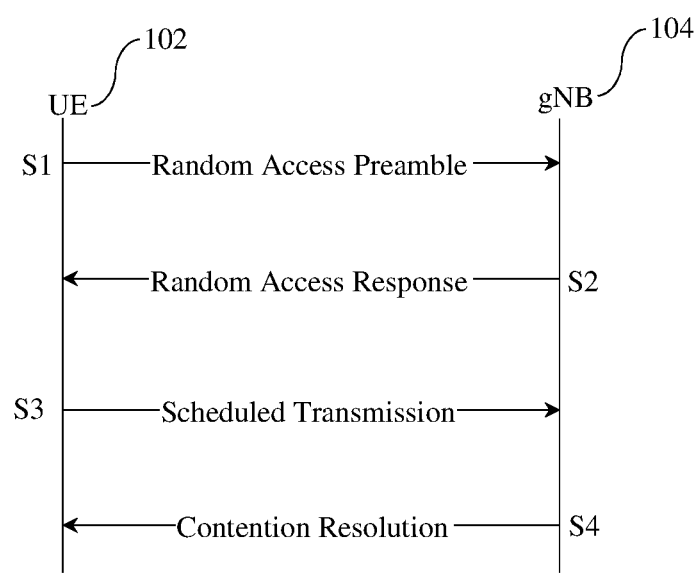
FIG. 1A schematically shows a four-step contention based random access (CBRA) procedure according to an example.

As shown in FIG. 1A, which shows the 4-step CBRA, at S1 a random access preamble is sent from a UE 102 to a gNB 104.

The gNB 104 sends the RA response to the UE 102 at S2.

At S3, the scheduled transmission is sent from the UE 102 to the gNB 104.

At S4, a contention resolution message is sent from the gNB 104 to the UE 102.

Figure 1B:
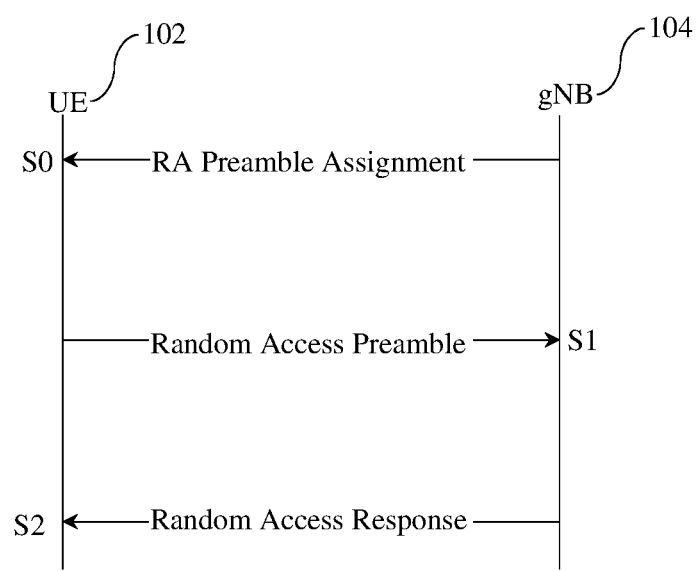
FIG. 1B schematically shows a two-step CBRA procedure according to an example.

As shown in FIG. 1B, which shows the 2-step CBRA, at S0 a preamble assignment is sent from gNB 104 to UE 102.

At S1, the random access preamble is sent from the UE 102 to the gNB 104.

Then, at S2, the random access response is sent from gNB 104 to UE 102.

Figure 1C:
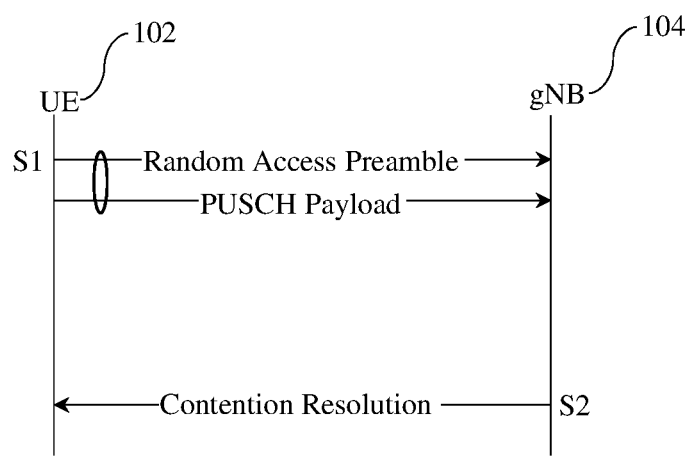
FIG. 1C schematically shows a contention free random access procedure (CFRA) according to an example.

As shown in FIG. 1C, which shows the CFRA, at S1 the random access preamble and PUSCH payload are sent from the UE 102 to the gNB 104.

At S2, a contention resolution message is sent from gNB 104 to UE 102.

In embodiments the UE selects the type of random access based on network configuration. In some examples a RSRP (reference signal received power) threshold may be configured for the UE to select between 2-step CBRA and 4-step CBRA.

Figure 2:
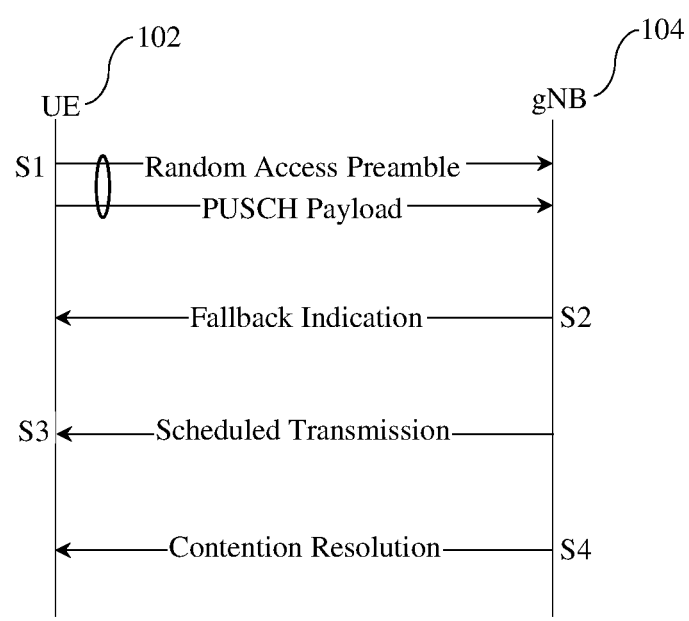
FIG. 2 schematically shows a fall-back procedure for changing from a two-step CBRA procedure to a four-step CBRA procedure.

In examples the MSGA of the 2-step random access (RA) includes a preamble on PRACH and a payload on PUSCH. After MSGA transmission, the UE monitors for a response from the network within a configured time window. If contention resolution is received successfully in MSGB, the UE sends HARQ feedback to the network and ends the random access procedure as shown in FIG. 1B. On the other hand if fall-back indication is received in MSGB, the UE falls back to 4-step RA and continues with MSG3 transmission as shown in FIG. 2. The UE can be further configured to switch to 4-step CBRA after a number of retries with 2-step CBRA.

As mentioned above, FIG. 2 schematically shows the fall-back procedure from 2-step RA to 4-step RA. The fall-back may be required, for example, since the NW may only be able to decode the preamble part of MsgA and not the PUSCH, so the NW can send to the UE the Msg3 as in 4-step RA procedure based on the preamble only. If the Msg3 transmission also fails, the UE will again use 2-step RA procedure and transmit MsgA.

S1 shows random access preamble and PUSCH payload sent from UE 102 to gNB 104.

S2 shows a fall-back indication sent from gNB 104 to UE 102.

S3 shows the scheduled transmission being sent from UE 102 to gNB 104.

S4 shows the contention resolution message being sent from the gNB 104 to the UE 102.

For random access in a cell configured with SUL (supplementary uplink), the network can explicitly signal which carrier to use (UL or SUL). Otherwise, the UE selects the SUL carrier if and only if the measured quality of the DL is lower than a broadcast threshold. Once started, all uplink transmissions of the random access procedure remain on the selected carrier.

When CA (carrier aggregation) is configured, the first three steps of CBRA always occur on the PCell (primary cell) while contention resolution (step 4) can be cross-scheduled by the PCell. The three steps of a CFRA started on the PCell remain on the PCell. CFRA on SCell (secondary cell) can only be initiated by the gNB to establish timing advance for a secondary TAG: the procedure is initiated by the gNB with a PDCCH order (step 0) that is sent on a scheduling cell of an activated SCell of the secondary TAG, preamble transmission (step 1) takes place on the indicated SCell, and Random Access Response (step 2) takes place on PCell.

In RAN2 meeting #107, the following was agreed:
1. If the 2-step random access procedure is not successfully completed even after transmitting the msgA 'N' times, UE fallbacks to 4 step RACH procedure i.e. UE only transmits the PRACH preamble.
2. Network can configure the number of times 'N' that a UE can attempt to re-transmit msgA during the random access procedure.
3. TB (transport block) size offered in UL grant in the fallback RAR (random access response) shall be the same as the TB size offered for payload transmission in MsgA; otherwise the UE behaviour is not defined (i.e. it is up to UE implementation).

Furthermore it was agreed that:
1. RA type selection is NOT left up to UE implementation.
2. If the UE is configured with 2-step RA, the RSRP is above a configurable threshold then the UE shall use the 2-step RA procedure.

In the 4-step RA procedure, the UE can select between preamble groups A and B based on the radio condition and the available data in the buffer or alternatively, based solely on the CCCH (common control channel) SDU (service data unit) size in the buffer. ("Group A" and "Group B", which are known in LTE RACH, are both sets of preambles in a same random access channel. For example group A may consist of preamble indices 0 to 31 and Group B may comprise preamble indices 32 to 48). This is described in more detail in 3GPP TS 38.321:

2> if Msg3 has not yet been transmitted:
  3> if Random Access Preambles group B is configured:
    4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB; or
    4> if the Random Access procedure was initiated for the CCCH logical channel and the CCCH SDU size plus MAC subheader is greater than ra-Msg3SizeGroupA:
      5> select the Random Access Preambles group B.
    4> else:
      5> select the Random Access Preambles group A.
  3> else:
    4> select the Random Access Preambles group A.

Furthermore, RAN1 meeting #98 agreed that:
For RRC_INACTIVE/IDLE state, at least support up to two msgA PUSCH configurations for Rel.16
  Using different preamble groups for the indications of different configurations in case of two configurations
  Support of more than two configurations is not precluded, and if supported FFS the following mechanisms for the indications of different configurations
    Alt.1: Using different preamble groups
    Alt 2: Using different preamble groups and/or RO partitioning
    Alt.3: Using UCI based indication
    Alt. 4: Using different DMRS ports/sequences
At least up to two msgA PUSCH configurations are supported for RRC_CONNECTED state for Rel.16
  FFS details
FFS whether the MsgA PUSCH configurations are the same among different RRC states (IDLE, INACTIVE, CONNECTED)
FFS the rule or BS signaling the criterion for the UE's selection of msgA PUSCH configuration.

Accordingly, 2-step RA procedure would similarly employ two preamble groups for different MSGA PUSCH payload size (could be similarly preamble groups A and B). From hereinafter, and for ease of explanation, the terminology preamble groups A2 and B2 is used to denote preamble group A and preamble group B of the 2-step RA, where '2' stands for 2-step RA. Similarly, the 4-step RA may comprise preamble groups A and B. In some examples where required for differentiation, it may be considered that: preamble group A of 2-step RA is known as a first preamble group; preamble group B of 2-step RA is known as a second preamble group; preamble group A of 4-step RA is known as a third preamble group; preamble group B of 4-step RA is known as a fourth preamble group.

Thus, according to the agreements that have been made, if a UE has selected 2-step RA procedure which fails a threshold number of times "N", the UE will cease using the 2-step procedure and will start using the 4-step RA procedure instead. There is a technical problem, identified in the present disclosure, that when the UE starts using the 4-step RA procedure, the preamble group it uses has to result in a same Msg3 TB size as it had for the TB of MSGA PUSCH, given the agreement in RAN2. In other words the Msg3 TB size needs to be the same as (or in some examples could be bigger than) the TB size of MsgA PUSCH. The UE behaviour is otherwise not defined (meaning this has to be handled by the network (NW)).

Therefore, in practice the NW should configure and provide a TB size for the 4-step preamble groups A and B that correspond one to one with the 2-step preamble groups A2 and B2. In practice, the 4-step preamble group A is configured to result in a TB size of 56 bits (based on the smallest RRC request, ie., CCCH SDU size) to enable the longest possible coverage for the cell. Preamble group B is or is likely be set to 72 bits in case Long I-RNTI from RRC_INACTIVE UEs is enabled—hence, RRC_INACTIVE UEs would use preamble group B to indicate they have CCCH SDU size bigger than 56 bits. Thus, in some examples, in the 4-step procedure it may be considered that a first preamble group (group A) has a TB size of 56 bits, and a second preamble group (group B) has a TB size of 72 bits.

Given that the 2-step RA type is selected based on cell quality being over a configured RSRP (reference signal received power) threshold, it is assumed bigger payloads than with 4-step procedure could already be carried in MSGA, enabling more diverse use of the 2-step procedure, e.g., by CONNECTED mode UEs having data to be transmitted. However, given the above observation the TB size given in the 4-step RAR grant has to result into the same size as the UE used in MSGA.

As will be discussed in more detail below, a mechanism is disclosed which gives the NW flexibility to use different grant sizes for 4-step and 2-step RA procedures.

Thus, in embodiments, whether a UE falls back to 4-step RA from 2-step RA (after a number of "N" failed attempts at 2-step RACH), is determined by the UE based on the preamble group that the UE was using when performing 2-step RA. For example, whether a UE falls back to 4-step RA from 2-step RA is, in some examples, based on the preamble group when using the 2-step RA. For example, whether a UE falls back to 4-step RA from 2-step RA is based on whether the UE was using preamble group "A2" or preamble group "B2" when using the 2-step RA.

For instance, if the UE uses a preamble group for 2-step RA (e.g., group A2) whose size matches with preamble group A or group B of 4-step RA, then after N failed attempts of the 2-step procedure, the UE will fall back to 4-step RA and continues with 4-step preamble transmission with the preamble group with matching size. For example, say that during the failed 2-step RA attempts the UE was using preamble group A2 (72 bits), and group B in the 4-step procedure is 72 bits, then when switching to the 4-step procedure the UE will use preamble group B in the four-step procedure.

On the other hand, if the UE uses a preamble group for 2-step RA (e.g. B2), that does not match in size with either of the preamble group A or group B of 4-step RA, then the UE keeps using 2-step RA whether it succeeds or fails (e.g. even after N attempts the UE will continue using the 2-step RA). So, for example, say that during the failed 2-step RA attempts the UE was using preamble group B2 (24 bits in this example), and in the 4-step procedure group A is 56 bits and group B is 72 bits (the available preamble groups), the UE will carry on using the 2-step procedure.

In other words, it may be considered that determining whether to switch to the second random access type is based at least in part on a comparison between a data payload size associated with a preamble used in the first random access type and a data payload size associated with a preamble available in the second random access type.

Figure 3:
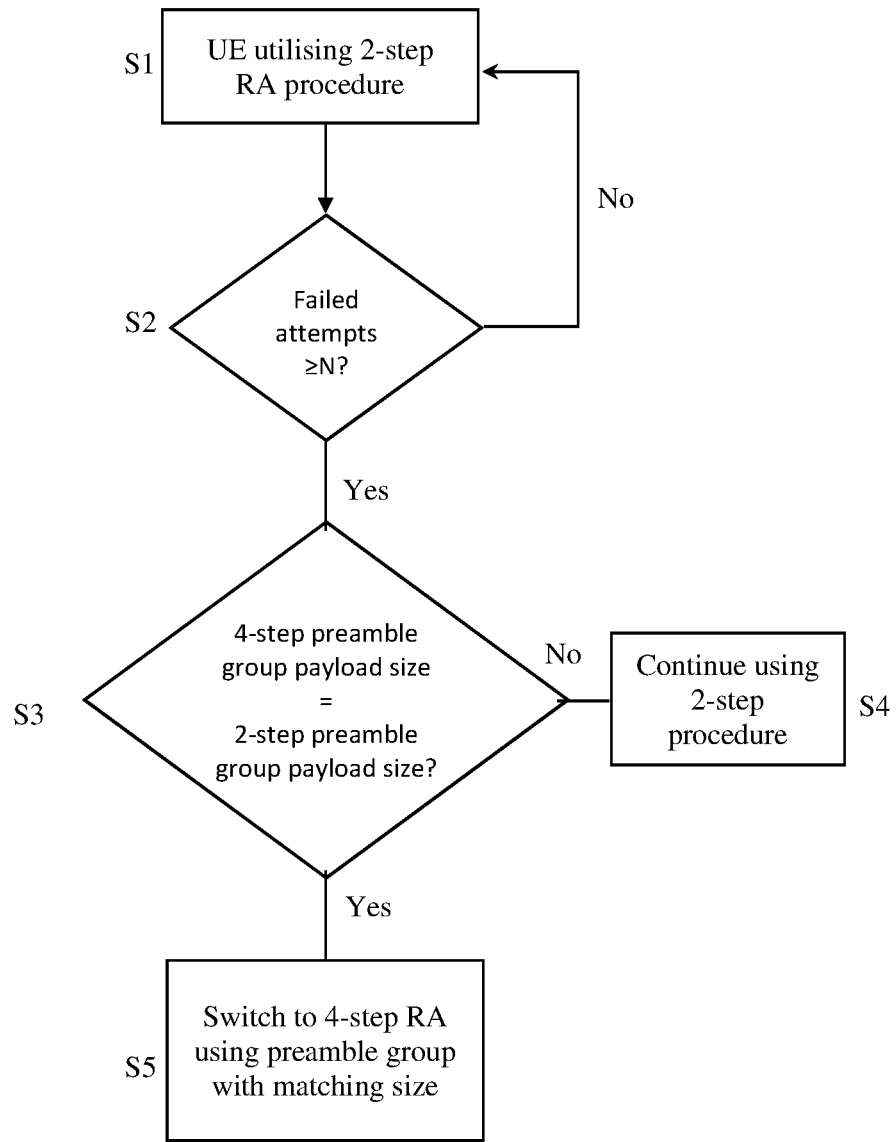
FIG. 3 schematically shows a flow chart of a method according to an example.

This process is schematically shown in FIG. 3.

As shown in FIG. 3, at S1 a UE is utilising a 2-step RA in an RA procedure. In other words the UE is using a first random access type in a random access procedure.

At S2, it is determined whether a number of failed RACH attempts utilising the 2-step RA is equal to or greater than N (i.e. a threshold value). In other words it is determined whether a threshold number of failed random access attempts has been reached using the first random access type.

If the determination at S2 is "No", the method loops back to S1.

If the determination at S2 is "Yes", the method proceeds to S3.

At S3, a determination is made whether an available 4-step RA preamble group associated with a payload size is equal to a payload size associated with a 2-step preamble group that was being used when utilising the 2-step RA (i.e. at S1). In other words a comparison is performed between a data payload size associated with a preamble used in the first random access type and a data payload size associated with a preamble available in the second random access type If the determination at S3 is "No", then the method proceeds to S4, where the UE continues the RA procedure using the 2-step RA.

If on the other hand the determination at S3 is "Yes", then the method proceeds to S5, where the UE switches to the 4-step RA using the preamble group with matching size.

In some examples the switching to the second random access type may be enabled when it is determined that the data payload size associated with a preamble group available in the second random access type is equal to or greater than the data payload size associated with a preamble group used in the first random access type.

According to some embodiments the method as shown in FIG. 3 can be implemented as follows.

In one embodiment, the NW configures whether the number "N" is applicable to preamble group A2, B2, or both when using the 2-step RA procedure. In other words the network configures to which preamble groups the threshold maximum number of failed preamble attempts is applicable when using the 2-step RA. That is in some examples the NW configures whether the threshold number of failed attempts applies to at least one of a first preamble group and a second preamble group of the first random access type.

In some embodiments, the NW can indicate which 4-step preamble group (e.g. preamble group A or B) the UE shall use in case it fallbacks after number of "N" failed attempts using 2-step RACH.

For instance, if the UE used preamble group A2 when using the 2-step RA, the NW can configure the UE to use preamble group A or B in 4-step RA. In another example, if the UE used preamble group B2 when using 2-step RA, if the NW did not configure the UE to use preamble group A or B in 4-step RA, this indicates to the UE it shall not switch to 4-step RA after number of "N" failed attempts using 2-step RACH but continue with 2-step RA.

In some examples, the UE is configured to switch to the second random access type after the threshold number of failed attempts has been reached only when the user equipment was using the group A preamble in the first random access type.

In some examples, the UE can determine the preamble group that it shall use for the 4-step procedure implicitly. For example, the UE can determine the preamble group that it shall use for the 4-step procedure implicitly, for example based on a data threshold. In other words the threshold may be a threshold to select between A and B groups based on the data payload size of the message to be transmitted. For example based on the data threshold the UE may determine to use preamble group A with 4-step and preamble group A2 with 2-step RA. For instance, if the data thresholds are the same for 4-step and 2-step RA to select preamble group A or A2, respectively, the UE shall use preamble group A for 4-step if it used preamble group A2 for 2-step procedure. In other words if the group data thresholds are the same for 2-step and 4-step RA, when switching from 2-step to 4-step the UE will use the equivalent group (i.e. if group A ("A2") used in 2-step, UE will select group A in 4-step; if group B ("B2") selected in 2-step, UE will select group B in 4-step). That is in some examples the determination of which preamble group to use is based upon a data threshold. It may also be considered that in some examples the NW configures the user equipment with data thresholds for determining whether to use the preamble group A or the preamble group B of the first random access type, and configures the UE with data thresholds for determining whether to use the preamble group A or the preamble group B of the second random access type.

In practice, and in some examples, the configuration could apply only for one or more specific preamble groups (e.g. preamble group B2), e.g. a BOOLEAN configuration if by using preamble group B2 the UE is allowed to fallback to 4-step RA while the fallback to 4-step RA by using preamble group A2 would always be allowed. In other words, in some examples the NW configures the UE with a Boolean configuration for the preamble group B of the first random access type, to indicate whether the user equipment is allowed to switch to the second random access procedure. Alternatively or additionally, by the network configuring "N" attempts, the network could implicitly configure the fallback to be allowed for preamble group A2 in case the maximum number of RA attempts (with any of the 2-step RA or 4-step RA) is higher than "N". That is in some examples fall-back from A2 is always enabled if the "N" attempts is either configured or it is less than the "maximum number of RA attempts".

In one embodiment, the UE determines implicitly whether after N attempts with 2-step RA, the UE is allowed to fall-back to use 4-step RA, and which 4-step preamble group (e.g. group A or group B) the UE shall select. In some examples such determination is based on a comparison of a group message size of the 4-step procedure and a group message size of the 2-step procedure. For example such determination can be based on the parameter ra-Msg3SizeGroupA (data threshold) of the 4-step RA procedure and corresponding ra-MsgASizeGroupA (data threshold) parameter defined for the 2-step RA procedure.

For instance, if the ra-Msg3SizeGroupA is configured to be "b56" (ie., 56 bits TB size), and ra-MsgASizeGroupA is configured to be "b72" (ie., 72 bits TB size), and NW has configured N attempts indicating fallback for preamble group A2 is allowed, then:

The UE determines the fallback is possible for preamble group A2 and it shall use preamble group B in the 4-step RA procedure (e.g. if UE has payload of 72 bits, the UE has to select group B in the 4-step RA in this example (where in this example the TB size associated with Group B is 72 bits)).

In another example, if the ra-Msg3SizeGroupA is configured to be b56 (ie., 56 bits TB size) and ra-MsgASize-GroupA is configured to be b24 (ie., 24 bits TB size), and NW has enabled fallback after 'N' attempts and indicates the UE shall use 4-step preamble group A if it used preamble group B2:

The UE determines the fallback is possible only for preamble group B2 and it shall use preamble group A for 4-step as per NW configuration.

That is, since the A2 group has the payload up to 24 bits, it should not switch to higher payload and therefore fallback from group A2 is not possible in this example. Therefore in this example NW indicates that fall-back is to group A from group B2 but it could also indicate that fall-back is to group B from B2. However, more generally it will be understood that in some examples it is configured that that fall-back is only possible from certain groups (e.g. A2 or B2).

In another embodiment the UE determines implicitly whether, after a number of N failed attempts with 2-step RA, the UE is allowed to fall-back to use the 4-step procedure based on the PUSCH payload size of the MSGA of the 2-step RA, if the payload size matches with the size configured for 4-step RA preamble groups. In some examples the fall-back to 4-step RA may also be enabled when the 4-step preamble group has a bigger maximum TB size than the preamble group that was being used in 2-step RA. That is in some examples the fall-back to 4-step RA is enabled or configured when the 4-step RA has a preamble group with a data payload size that is equal to or greater than a data payload size of the preamble group being used in the 2-step RA.

It will be understood that embodiments may enable the NW to apply different grant/TB sizes for the preamble groups of 2-step RA and 4-step RA in a RA procedure by coordinating the grant/TB size between groups from each 2-step and 4-step RA.

Embodiments may allow configurations where one of the RA procedures (usually 4-step) has a lower minimum grant size for the preamble group A by enabling 2-step from preamble group A2 fallback to 4-step preamble group B.

Alternatively, embodiments may allow configurations where one of the RA procedures (usually 2-step) has a bigger grant size for the preamble group B2 by 2-step preamble group A2 fallback to either 4-step preamble group A or B. Group B generally has a bigger payload size associated with it than group A (hence the data threshold). So in examples there may be a bigger grant size for one of the groups in 2-step, and fall-back from that group to 4-step may be disallowed or prevented. The remaining group (A2) can then fall-back to 4-step preamble group A or B (which usually would be B).

Figure 4:
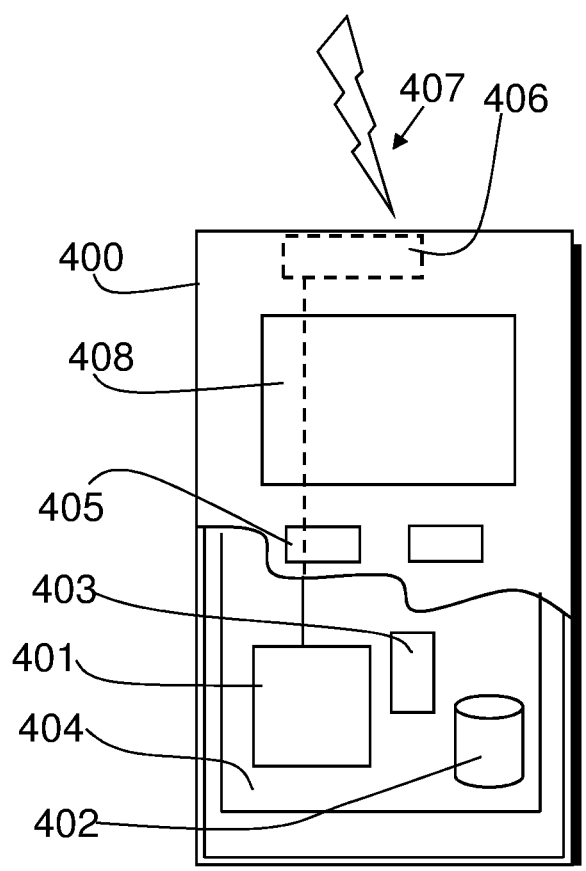
FIG. 4 schematically shows a wireless device according to an example.

A possible wireless communication device will now be described in more detail with reference to FIG. 4 showing a schematic, partially sectioned view of a communication device 400. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 400 may receive signals over an air or radio interface 407 via appropriate apparatus for receiving and may transmit signals via appropriate apparatus for transmitting radio signals. In FIG. 4 transceiver apparatus is designated schematically by block 406. The transceiver apparatus 406 may be provided for example by means of a radio part and associated antenna arrangement. The antenna arrangement may be arranged internally or externally to the wireless device.

A wireless device is typically provided with at least one data processing entity 401, at least one memory 402 and other possible components 403 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 404. The user may control the operation of the wireless device by means of a suitable user interface such as key pad 405, voice commands, touch sensitive screen or pad, combinations thereof or the like. A display 408, a speaker and a microphone can be also provided. Furthermore, a wireless communication device may comprise appropriate connectors (either wired or wireless) to other devices and/or for connecting external accessories, for example hands-free equipment, thereto.

Figure 5:
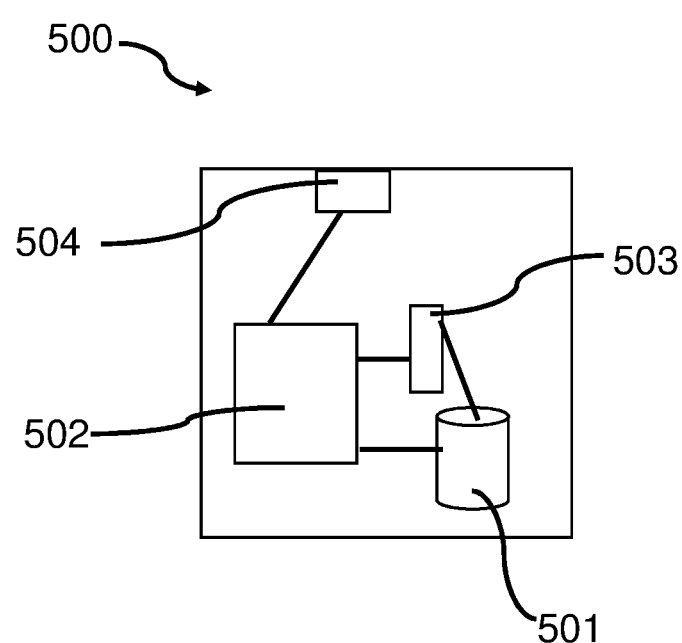
FIG. 5 schematically shows a control apparatus according to an example.

FIG. 5 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 500 can be arranged to provide control on communications in the service area of the system. The control apparatus 500 comprises at least one memory 501, at least one data processing unit 502, 503 and an input/output interface 504. Via the interface the control apparatus can be coupled to a receiver and a transmitter of the base station. The receiver and/or the transmitter may be implemented as a radio front end or a remote radio head. For example the control apparatus 500 or processor 501 can be configured to execute an appropriate software code to provide the control functions.

Figure 6:
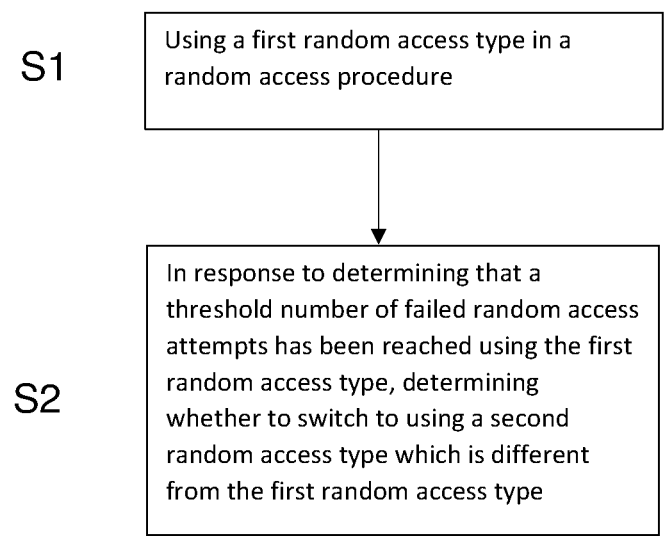
FIG. 6 is a flow chart schematically showing a method according to an example.

FIG. 6 is a flow chart of a method according to an example. The flow chart of FIG. 6 is viewed from the perspective of an apparatus. The apparatus may for example be a UE.

At S1, the method comprises using a first random access type in a random access procedure.

At S2, the method comprises, in response to determining that a threshold number of failed random access attempts has been reached using the first random access type, determining whether to switch to using a second random access type which is different from the first random access type.

Figure 7:
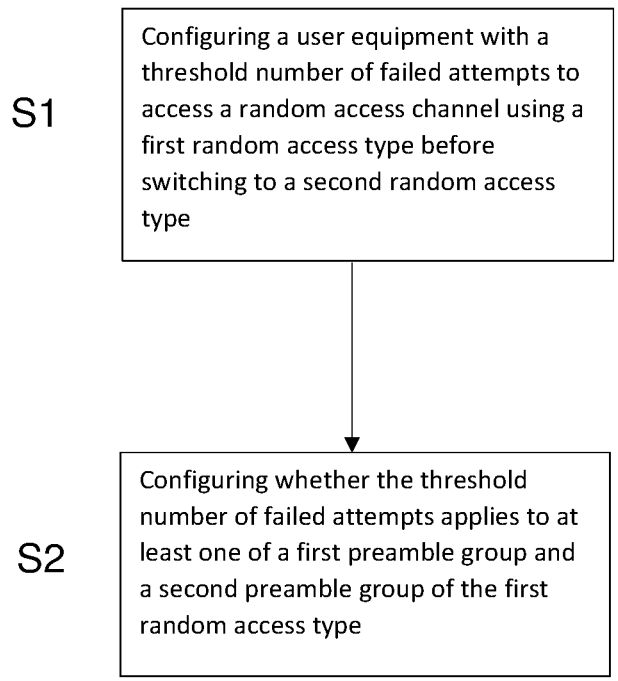
FIG. 7 is a flow chart schematically showing a method according to an example.

FIG. 7 is a flow chart of a method according to an example. The flow chart of FIG. 7 is viewed from the perspective of an apparatus. The apparatus may for example be a base station such as a gNB.

At S1, the method comprises configuring a user equipment with a threshold number of failed attempts to access a random access channel using a first random access type before switching to a second random access type.

As shown at S2, the method comprises configuring whether the threshold number of failed attempts applies to at least one of a first preamble group and a second preamble group of the first random access type.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
at least one processor; and
at least one memory comprising computer program code, the at least one memory and the computer program code being configured to, with the at least one processor, cause the apparatus to:
use a first random access type in a random access procedure;
in response to determining that a threshold number of failed random access attempts has been reached using the first random access type, determine whether to switch to using a second random access type which is different from the first random access type; and
select, in dependence on a preamble group used in the first random access type, to use a preamble group in the second random access type.

2. The apparatus of claim 1, wherein the at least one memory and the computer program code are further configured to, with the at least one processor, cause the apparatus to:
switch to the second random access type in a manner that is in accordance with a configuration provided by a network.

3. The apparatus of claim 2, wherein the configuration provided by the network explicitly configures whether the apparatus is allowed to switch to the second random access type.

4. The apparatus of claim 1, wherein the preamble group comprises one of a first preamble group or a second preamble group.

5. The apparatus of claim 4, wherein the first preamble group comprises a group A preamble and the second preamble group comprises a group B preamble.

6. The apparatus of claim 1, wherein the determining whether to switch to the second random access type is based at least in part on a comparison between a data payload size associated with a preamble used in the first random access type and a data payload size associated with a preamble available in the second random access type.

7. The apparatus of claim 6, wherein the using the first random access type comprises using a first preamble or a second preamble which are available in the first random access type, and the determining whether to switch to the second random access type is dependent on whether the second random access type has an available preamble which has an associated data payload size which matches a data payload size associated with the first preamble or the second preamble which was used in the first random access type.

8. The apparatus of claim 1, wherein the at least one memory and the computer program code are further configured to, with the at least one processor, cause the apparatus to:
determine whether to switch to the second random access type based at least in part on a determination of a data payload to be transmitted by the apparatus.

9. The apparatus of claim 1, wherein the first random access type comprises a two-step random access and the second random access type comprises a four-step random access.

10. The apparatus of claim 1, wherein the apparatus comprises a user equipment.

11. The apparatus of claim 1, wherein the preamble group used in the first random access type differs from the preamble group in the second random access type.

12. An apparatus comprising:
at least one processor; and
at least one memory comprising computer program code, the at least one memory and the computer program code being configured to, with the at least one processor, cause the apparatus to perform:

configuring a user equipment with a threshold number of failed attempts to access a random access channel using a first random access type before switching to a second random access type; and configuring the user equipment to use a preamble group in case of switching from the first random access type to the second random access type, wherein the configuring the user equipment to use the preamble group comprises configuring the user equipment to use a preamble group in the second random access type in dependence on a preamble group used in the first random access type.

13. The apparatus of claim 12, wherein the preamble group comprises one of a first preamble group or a second preamble group.

14. The apparatus of claim 13, wherein the first preamble group comprises a group A preamble and the second preamble group comprises a group B preamble.

15. The apparatus of claim 12, wherein the at least one memory and the computer program code are further configured to, with the at least one processor, cause the apparatus to perform:

configuring the user equipment whether the user equipment is allowed to switch to the second random access type.

16. The apparatus of claim 12, wherein the apparatus comprises a base station.

17. A method comprising:

using, by a user equipment, a first random access type in a random access procedure;

in response to determining that a threshold number of failed random access attempts has been reached using the first random access type, determining by the user equipment whether to switch to using a second random access type which is different from the first random access type; and selecting, in dependence on a preamble group used in the first random access type, to use a preamble group in the second random access type.

\* \* \* \* \*